(12) United States Patent
Ottaviano et al.

(10) Patent No.: US 8,087,249 B2
(45) Date of Patent: Jan. 3, 2012

(54) TURBINE COOLING AIR FROM A CENTRIFUGAL COMPRESSOR

(75) Inventors: Marcus Joseph Ottaviano, North Reading, MA (US); Robert John Parks, Ipswich, MA (US); John Lawrence Noon, Swampscott, MA (US); Mark Michael D'Andrea, Belmont, MA (US); Thomas Michael Regan, Marblehead, MA (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 12/343,019

(22) Filed: Dec. 23, 2008

(65) Prior Publication Data

US 2010/0154433 A1 Jun. 24, 2010

(51) Int. Cl.
*F02C 1/00* (2006.01)

(52) U.S. Cl. ............................................ 60/726; 60/806

(58) Field of Classification Search .................... 60/736, 60/751, 782, 785, 806, 726; 415/115, 144–145; 416/95, 96 R
See application file for complete search history.

(56) References Cited

U.S. PATENT DOCUMENTS

| 3,832,090 | A | * | 8/1974 | Matto | 416/95 |
| 3,979,903 | A | | 9/1976 | Hull, Jr. et al. | |
| 4,425,079 | A | * | 1/1984 | Speak et al. | 415/139 |
| 4,462,204 | A | * | 7/1984 | Hull | 60/806 |
| 4,576,550 | A | | 3/1986 | Bryans | |
| 5,555,721 | A | | 9/1996 | Bourneuf et al. | |
| 6,190,123 | B1 | | 2/2001 | Wunderwald et al. | |
| 6,585,482 | B1 | | 7/2003 | Liotta et al. | |
| 7,287,384 | B2 | | 10/2007 | Fish et al. | |
| 7,827,798 | B2 | * | 11/2010 | Commaret et al. | 60/751 |
| 7,937,951 | B2 | * | 5/2011 | Brunet et al. | 60/806 |
| 2006/0123795 | A1 | * | 6/2006 | Fish et al. | 60/772 |

* cited by examiner

*Primary Examiner* — William H Rodriguez
*Assistant Examiner* — Phutthiwat Wongwian
(74) *Attorney, Agent, or Firm* — William Scott Andes; Steven J. Rosen

(57) ABSTRACT

A gas turbine engine turbine cooling system includes an impeller and a diffuser directly downstream of the impeller, a bleed for bleeding clean cooling air from downstream of the diffuser, and one or more channels in fluid communication with the bleed. Each of the channels having a generally radially extending section followed by a generally axially aftwardly extending section terminating at an annular cooling air plenum connected to accelerators. The radially and axially aftwardly extending sections may be connected by a bend section of the cooling air channel and the axially aftwardly extending section may be angled radially inwardly going from the bend section to the cooling air plenum. Each of the cooling channels includes an inner wall formed by a forward end wall extending radially outwardly from an inner combustor casing, an annular cover covering a radially inner portion of the forward end wall, and the inner combustor casing.

25 Claims, 7 Drawing Sheets

TURBINE COOLING AIR FROM A CENTRIFUGAL COMPRESSOR

GOVERNMENT INTERESTS

This invention was made with government support under government contract No. N00019-06-C-0081 awarded by the Department of Defense. The government has certain rights to this invention.

BACKGROUND OF THE INVENTION

1. Technical Field

The present invention relates generally to gas turbine engines having centrifugal compressors and, more specifically, supplying turbine cooling air from a centrifugal compressor.

2. Background Information

A conventional gas turbine engine typically includes a compressor, combustor and turbine, both rotating turbine components such as blades, disks and retainers, and stationary turbine components such as vanes, shrouds and frames routinely require cooling due to heating thereof by hot combustion gases. Cooling of the turbine, especially the rotating components, is important to the proper function and safe operation of the engine. Failure to adequately cool a turbine disk and its blading, for example, by providing cooling air deficient in supply pressure, volumetric flow rate or temperature margin, may be detrimental to the life and mechanical integrity of the turbine. Depending on the nature and extent of the cooling deficiency, the impact on engine operation may range from relatively benign blade tip distress, resulting in a reduction in engine power and useable blade life, to a rupture of a turbine disk, resulting in an unscheduled engine shutdown.

Balanced with the need to adequately cool the turbine is the desire for higher levels of engine operating efficiency which translate into lower fuel consumption and lower operating costs. Since turbine cooling air is typically drawn from one or more stages of the compressor and channelled by various means such as pipes, ducts and internal passageways to the desired components, such air is not available to be mixed with fuel, ignited in the combustor and undergo work extraction in the primary gas flowpath of the turbine. Total cooling flow bled from the compressor is a loss in the engine operating cycle, and it is desirable to keep such losses to a minimum.

Some conventional engines employ clean air bleed systems to cool turbine components in gas turbines using an axi-centrifugal compressor as is done in the General Electric CFE738 engine. The turbine cooling supply air exits the centrifugal diffuser through a small gap between the diffuser exit and deswirler inner shroud. This air is then ducted radially inward by expensive integrally cast passages to the inside of the inner combustion case where it is then ducted into an accelerator via an arduous path where the airflow must make several 90 degree turns generating losses (and thus raising the temperature of the cooling air) before going through the accelerator. After leaving the accelerator, this cooling air travels up along a first stage turbine disk into a first stage turbine blade. The various turns of the cooling air are a loss in the engine operating cycle, and it is desirable to keep such losses to a minimum.

BRIEF DESCRIPTION OF THE INVENTION

A gas turbine engine turbine cooling system includes an annular centrifugal compressor impeller of a high pressure rotor, an annular centrifugal compressor impeller of a high pressure rotor, and a diffuser directly downstream of the impeller. A cooling air bleed for bleeding clean cooling air from a bleed location is located downstream of an outlet of the diffuser. One or more channels are in fluid communication with the cooling air bleed means and each of the channels has a generally radially extending section followed by a generally axially aftwardly extending section. The channels terminate at and are in fluid communication with an annular cooling air plenum which is in fluid supply communication with one or more accelerators.

An exemplary embodiment of the system includes the cooling air bleed means having an annular manifold in fluid communication with the bleed location downstream of an outlet of the diffuser and the bleed location located where compressor discharge pressure air enters a deswirl cascade along an internal radius portion of the deswirl cascade. An annular combustor stator assembly included a radially extending forward end wall extending radially outwardly from and joined to an inner combustor casing, a radially outer portion of the forward end wall being an aft wall of the diffuser, and a stator plenum disposed between and in fluid communication with the impeller and the annular cavity. The stator plenum is bounded by a radially inner portion of the forward end wall and an annular cover spaced axially aftwardly of the radially inner portion of the forward end wall. Each of the cooling channels has a channel inner wall running along a radially outer portion of the forward end wall, the annular cover, and the inner combustor casing.

The generally radially and axially aftwardly extending sections may be connected by a bend section of the cooling air channel and the generally axially aftwardly extending section may be angled radially inwardly going from the bend section to the cooling air plenum. Circumferentially spaced apart channel side walls may extend outwardly from and be attached to the channel inner wall and a channel outer wall may be spaced outwardly from the channel inner wall and attached to the channel side walls. Each of the cooling channels may terminate at an aft conical section of the inner combustor casing between the annular cooling air plenum and the cooling channels. Cooling air apertures are disposed through the aft conical section between the annular cooling air plenum and the cooling channels.

DETAILED DESCRIPTION OF THE INVENTION

Figure 1:
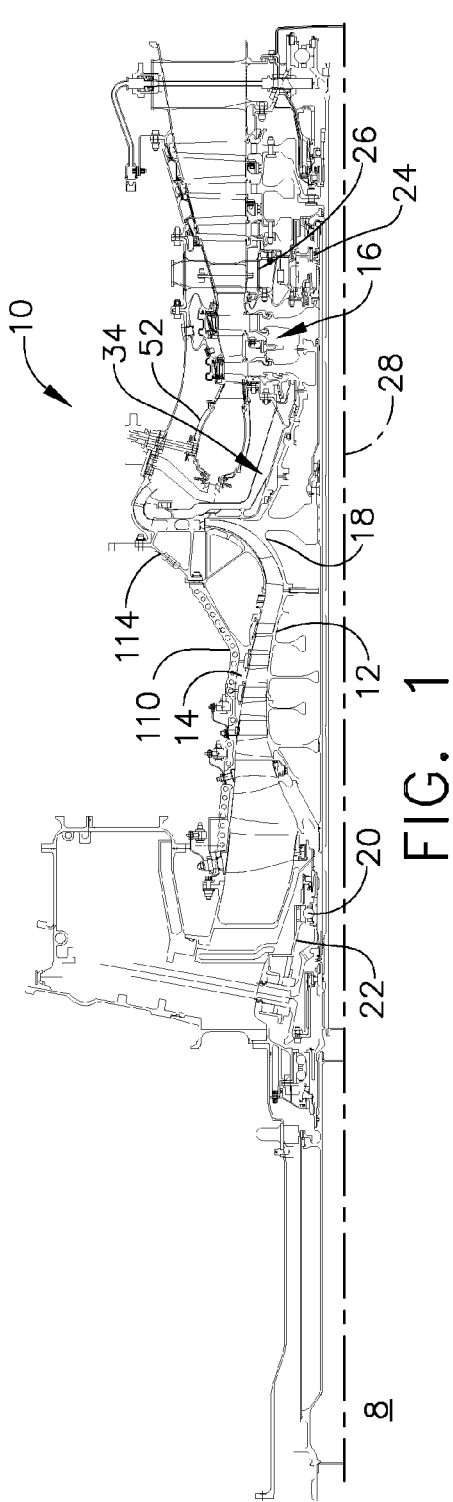
FIG. 1 is a sectional view illustration of a gas turbine engine having a centrifugal compressor impeller forward thrust apparatus.

Illustrated in FIG. 1, gas turbine engine 8 with a high pressure gas generator 10 having a single stage centrifugal compressor 18 as a final compressor stage and an axial forward thrust apparatus 34 for maintaining a forward thrust on the high pressure rotor (12) for helping to maintain or control clearances or gaps between the high pressure rotor 12 and stator throughout the high pressure gas generator 10. Further referring to FIG. 2, the high pressure gas generator 10 has a high pressure rotor 12 including, in downstream flow relationship, a high pressure compressor 14, a combustor 52, and a high pressure turbine 16. The rotor 12 is rotatably supported about an engine centerline 28 by a forward bearing 20 in a front frame 22 and a rear bearing 24 disposed downstream of high pressure turbine 16 in a turbine frame 26.

The exemplary embodiment of the compressor 14 illustrated herein includes a five stage axial compressor 30 followed by the single stage centrifugal compressor 18 having an annular centrifugal compressor impeller 32. Outlet guide vanes 40 are disposed between the five stage axial compressor 30 and the single stage centrifugal compressor 18. Further referring to FIGS. 3 and 5, compressor discharge pressure (CDP) air 76 exits the impeller 32 and passes through a diffuser 42 and then through a deswirl cascade 44 into a combustion chamber 45 within the combustor 52. The combustion chamber 45 is surrounded by annular radially outer and inner combustor casings 46, 47. Air 76 is conventionally mixed with fuel provided by a plurality of fuel nozzles 48 and ignited and combusted in an annular combustion zone 50 bounded by annular radially outer and inner combustion liners 72, 73.

The combustion produces hot combustion gases 54 which flow through the high pressure turbine 16 causing rotation of the high pressure rotor 12 and continue downstream for further work extraction in a low pressure turbine 78 and final exhaust as is conventionally known. In the exemplary embodiment depicted herein, the high pressure turbine 16 includes, in downstream serial flow relationship, first and second high pressure turbine stages 55, 56 having first and second stage disks 60, 62. A high pressure shaft 64 of the high pressure rotor 12 connects the high pressure turbine 16 in rotational driving engagement to the impeller 32. A first stage nozzle 66 is directly upstream of the first high pressure turbine stage 55 and a second stage nozzle 68 is directly upstream of the second high pressure turbine stage. An annular cavity 74 is radially disposed between the inner combustor casing 47 and the high pressure shaft 64 of the high pressure rotor 12.

Figure 2:
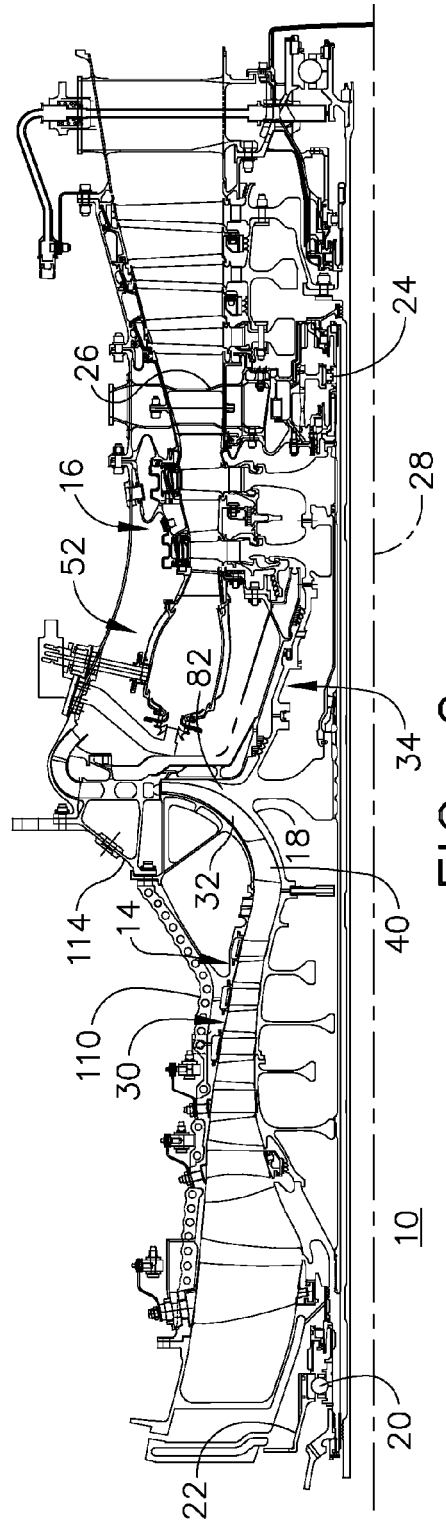
FIG. 2 is an enlarged sectional view illustration of the gas generator illustrated in FIG. 1.
Figure 3:
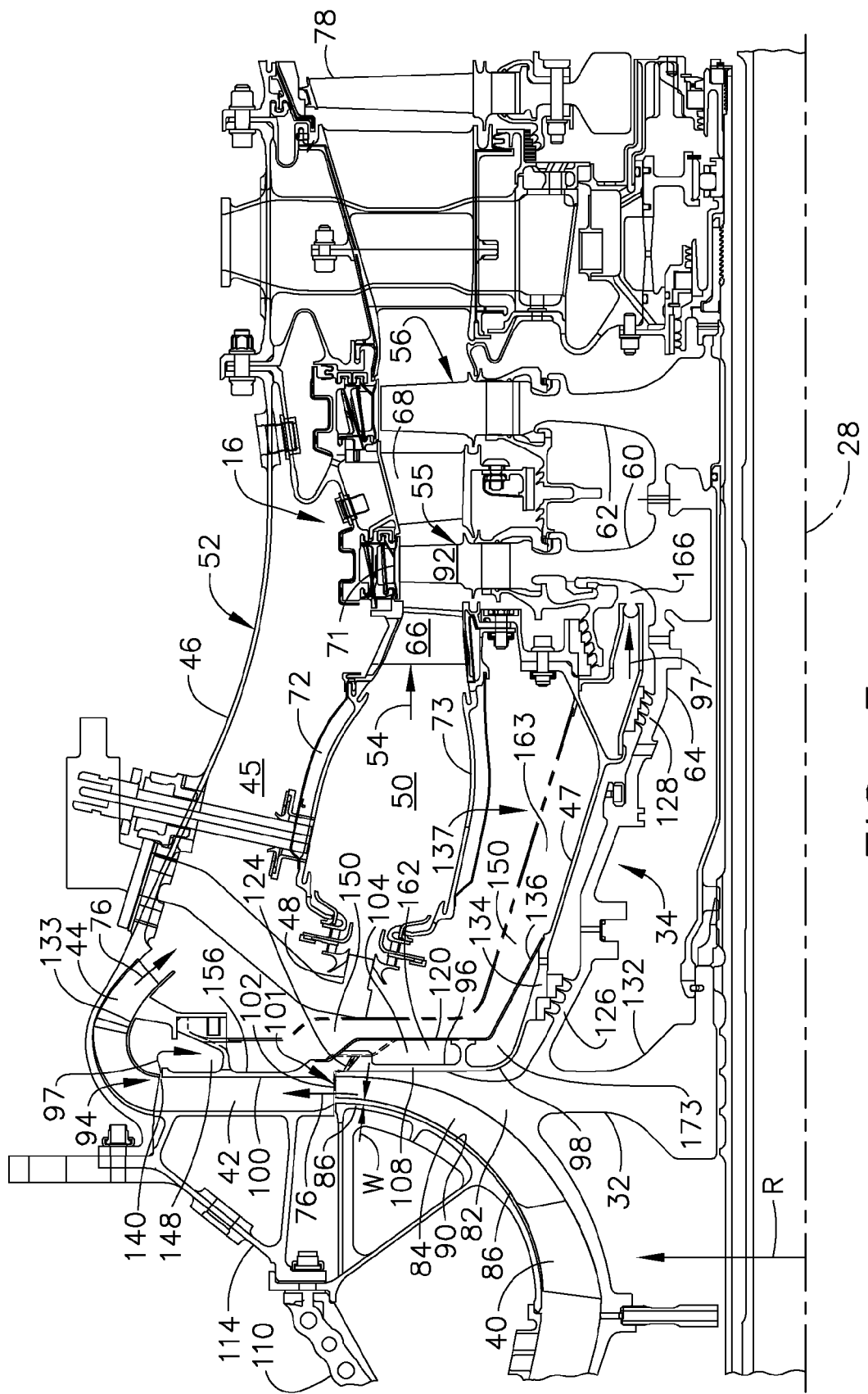
FIG. 3 is an enlarged sectional view illustration of the centrifugal compressor and the forward thrust apparatus illustrated in FIG. 2.

Referring to FIG. 3, the compressor discharge pressure (CDP) air 76 is discharged from the impeller 32 of the centrifugal compressor 18 and used to combust fuel in the combustor 52 and to cool components of turbine 16 subjected to the hot combustion gases 54; namely, the first stage nozzle 66, a first stage shroud 71 and the first stage disk 60. The compressor 14 includes a forward casing 110 and an aft casing 114 as more fully illustrated in FIGS. 1 and 2. The forward casing 110 generally surrounds the axial compressor 30 and the aft casing 114 generally surrounds the centrifugal compressor 18 and supports the diffuser 42 directly downstream of the centrifugal compressor 18. The compressor discharge pressure (CDP) air 76 is discharged from the impeller 32 of the centrifugal compressor 18 directly into the diffuser 42.

Figure 4:
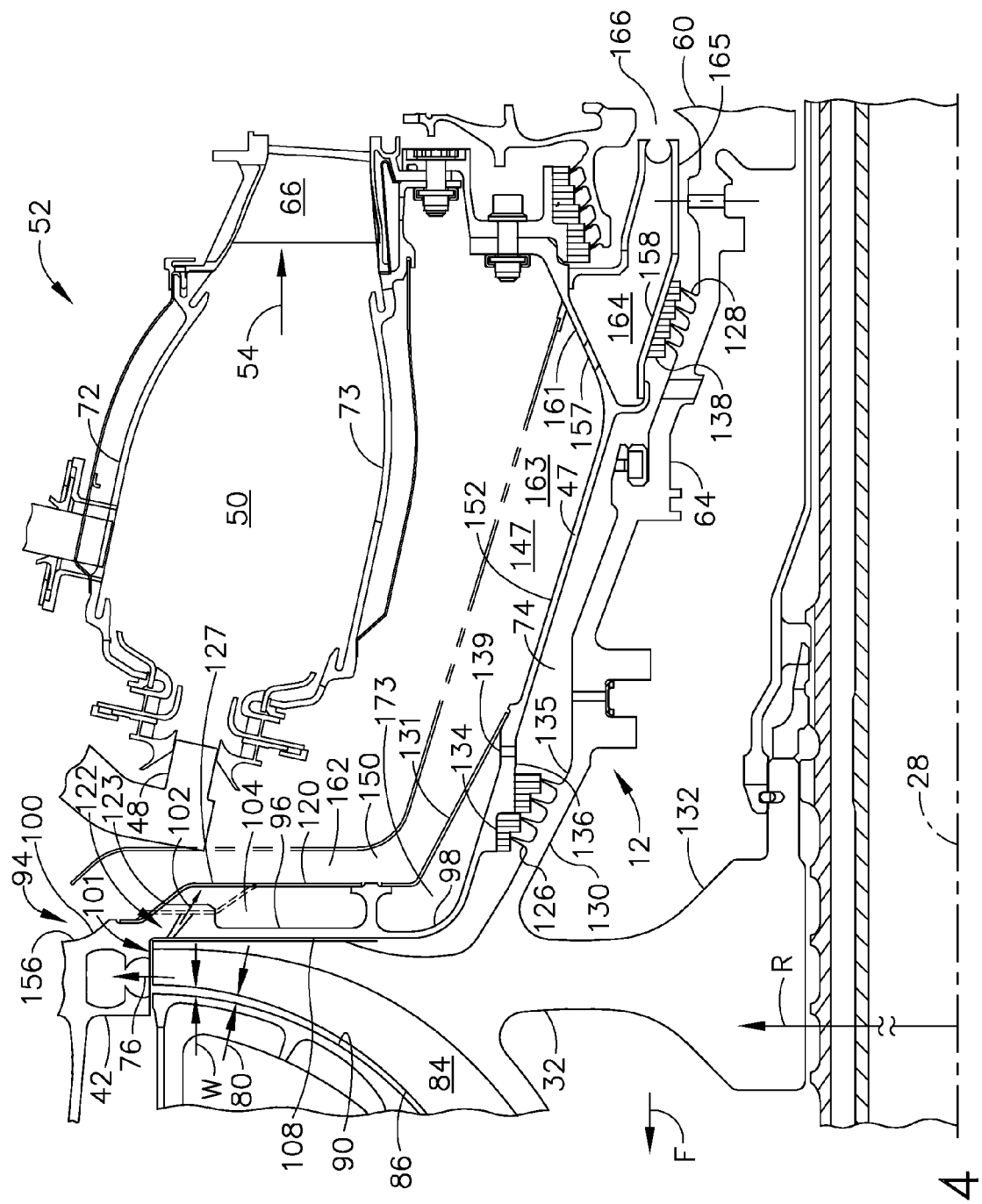
FIG. 4 is an enlarged sectional view illustration of the forward thrust apparatus and a turbine cooling system illustrated in FIG. 3.

Referring to FIGS. 2, 3, and 4, the impeller 32 includes a plurality of centrifugal compressor blades 84 radially extending from rotor disc portion 82. Opposite and axially forward of the compressor blades 84 is an annular blade tip shroud 90. The shroud 90 is adjacent to blade tips 86 of the compressor blades 84 defining an annular blade tip clearance 80 therebetween. The blade tip clearance 80 varies in axial width W in a radial direction R as measured from the engine centerline 28. It is desirable to minimize the blade tip clearance 80 during the engine operating cycle and avoid or minimize rubs between the shroud 90 and the blade tips 86 of the compressor blades 84, particularly, during engine accelerations such as during cold bursts.

It is known to provide sufficient forward rotor thrust to properly operate the impeller 32 in order to minimize the blade tip clearance 80 during the engine operating cycle in general to maintain or control clearances between the high pressure rotor 12 and stator throughout the high pressure gas generator 10. The forward thrust apparatus 34 is designed to provide this forward rotor thrust and is illustrated in more detail in FIGS. 4-7.

Figure 8:
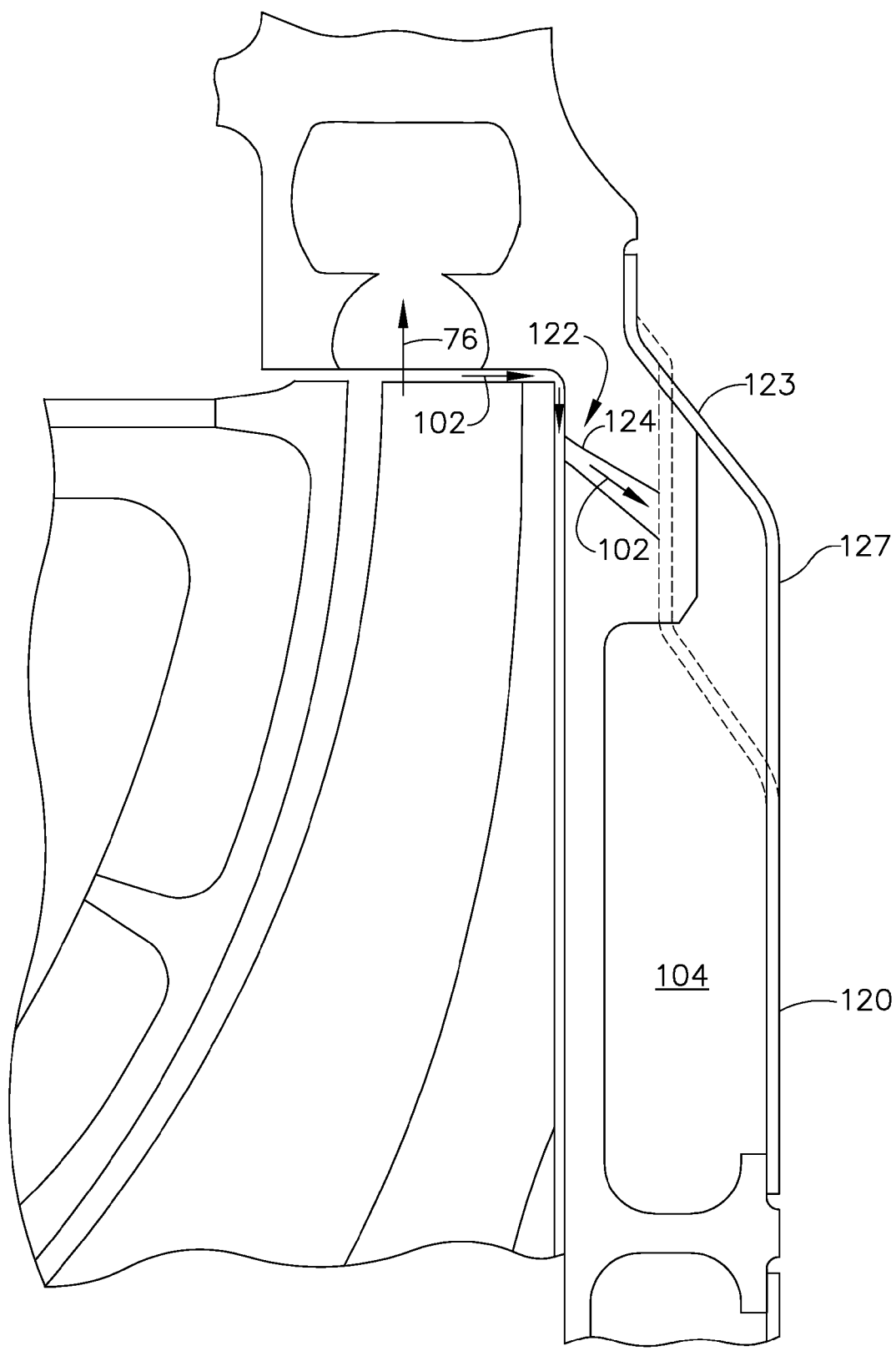
FIG. 8 is an enlarged sectional view illustration of bleeding impeller tip aft bleed flow between the impeller and the diffuser and into the forward thrust apparatus illustrated in FIG. 4.

Referring to FIGS. 3 and 4, an annular combustor stator assembly 94 includes an annular radially extending forward end wall 96 extending radially outwardly from and joined to the inner combustor casing 47 by an annular bend 98. The exemplary annular combustor stator assembly 94 illustrated herein is a unitary one piece element made from a single or one piece casting. A radially outer portion of the forward end wall 96 forms an aft wall 100 of the diffuser 42. An impeller bleed means 101 for bleeding impeller tip aft bleed flow 102 from between the impeller 32 and the diffuser 42 and flow the aft bleed flow 102 into an annular stator plenum 104 of the annular combustor stator assembly 94 as illustrated in greater detail in FIG. 8. The stator plenum 104 is bounded by a radially inner portion 108 of the forward end wall 96 and an annular cover 120 further illustrated in FIGS. 5 and 6. The annular cover 120 includes a cover aft wall 123 having a planar annular wall section 127 followed by a conical wall section 131. The annular cover 120 is attached to the forward end wall 96 and the inner combustor casing 47 and may be made of sheet metal.

Figure 7:
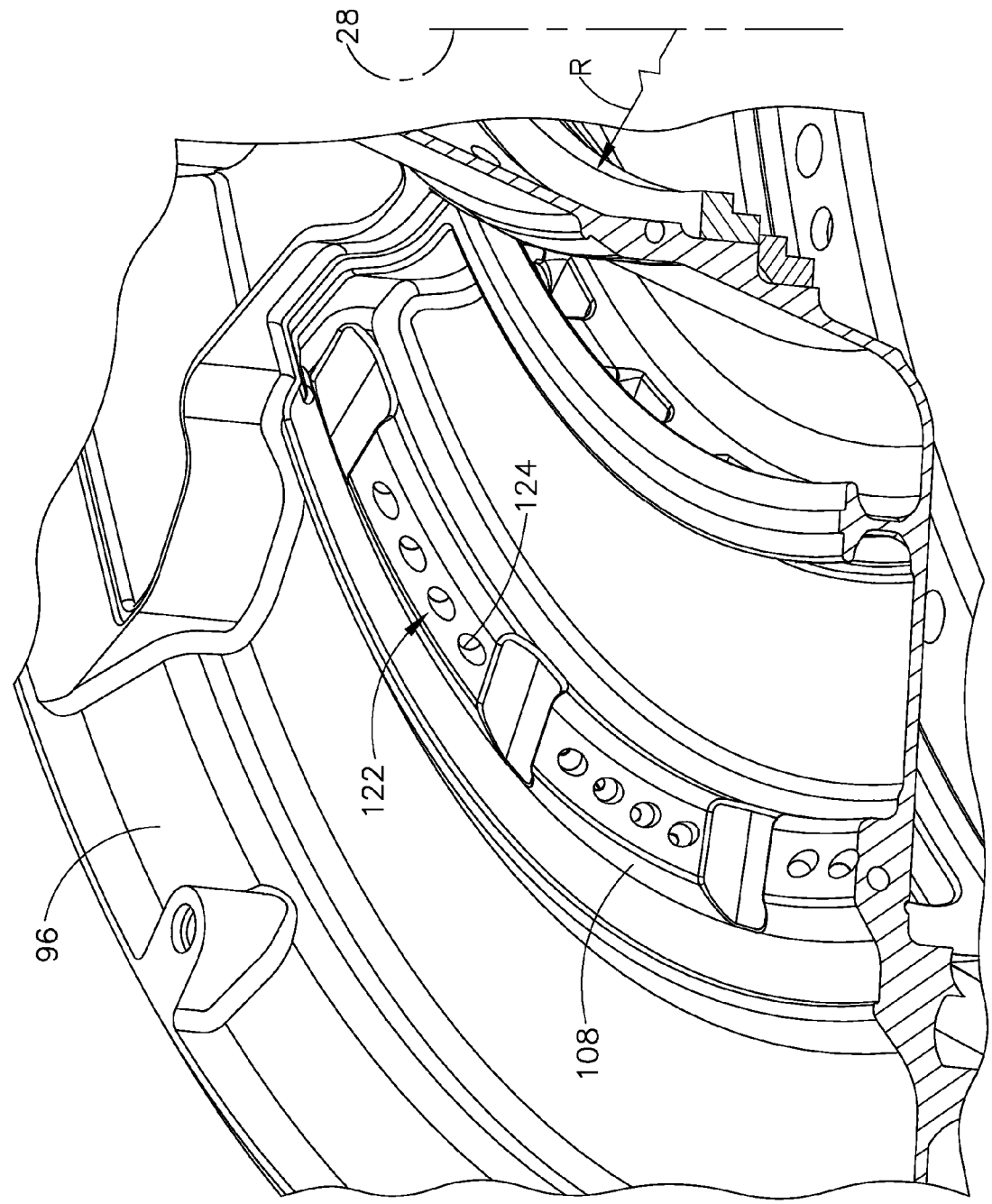
FIG. 7 is a perspective view illustration of conical diffusion holes through which impeller aft bleed air is diffused into the plenum illustrated in FIG. 3.

The impeller tip aft bleed flow 102 is diffused through a circumferentially arrayed plurality 122 of conical diffusion holes 124 in the inner portion 108 of the forward end wall 96 as further illustrated in FIG. 7. The conical diffusion holes 124 are illustrated herein as being conical but may be otherwise shaped. The conical diffusion holes 124 are also illustrated herein as being axially or circumferentially or axially and circumferentially angled which provides longer holes for a greater amount of diffusion with lower airflow losses through the holes.

Referring more specifically to FIGS. 3 and 4, the annular cavity 74 which is radially disposed between the inner combustor casing 47 and the high pressure shaft 64 of the high pressure rotor 12 is axially sealed by forward and aft thrust balance seals 126, 128. Note that the annular cover 120 is attached to the inner combustor casing 47 aft of the forward thrust balance seal 126. The forward thrust balance seal 126 is located on a radially outer surface 135 of an aft conical arm 130 of the impeller 32 of the rotor 12 immediately aft of an impeller bore 132 of the impeller 32. The forward thrust balance seal 126 seals against a forward thrust balance land 134 mounted on a radially inner surface 136 of the inner combustor casing 47. The aft thrust balance seal 128 is located on the radially outer surface 135 of the high pressure shaft 64 of the rotor 12 and seals against an aft thrust balance land 138 mounted to and extends radially outwardly of a plenum casing 158 used for cooling the high pressure turbine 16. Incorporating the rotating forward thrust balance seal directly on the impeller of the rotor 12 provides a more efficient stator architecture design allows for a low-loss clean air bleed circuit to cool the turbine.

High pressure air in the stator plenum 104 is created by diffusing the impeller tip aft bleed flow 102 through the conical diffusion holes 124 in the inner portion 108 of the forward end wall 96. The high pressure air in the stator plenum 104 is metered by precisely sized angled metering holes 139 in the inner combustor casing 47 (also illustrated in FIG. 5) to flow into the annular cavity 74 which provides a positive axial thrust in the forward direction F on the impeller 32. This relatively higher static pressure air in the stator plenum 104 pressurizes the annular cavity 74 between the inner combustor casing 47 and the high pressure shaft 64 of the high pressure rotor 12 (the stator and the rotor) and between the forward and aft thrust balance seals 126, 128 which pushes the impeller 32 forward to provide the necessary amount of forward rotor thrust.

Figure 5:
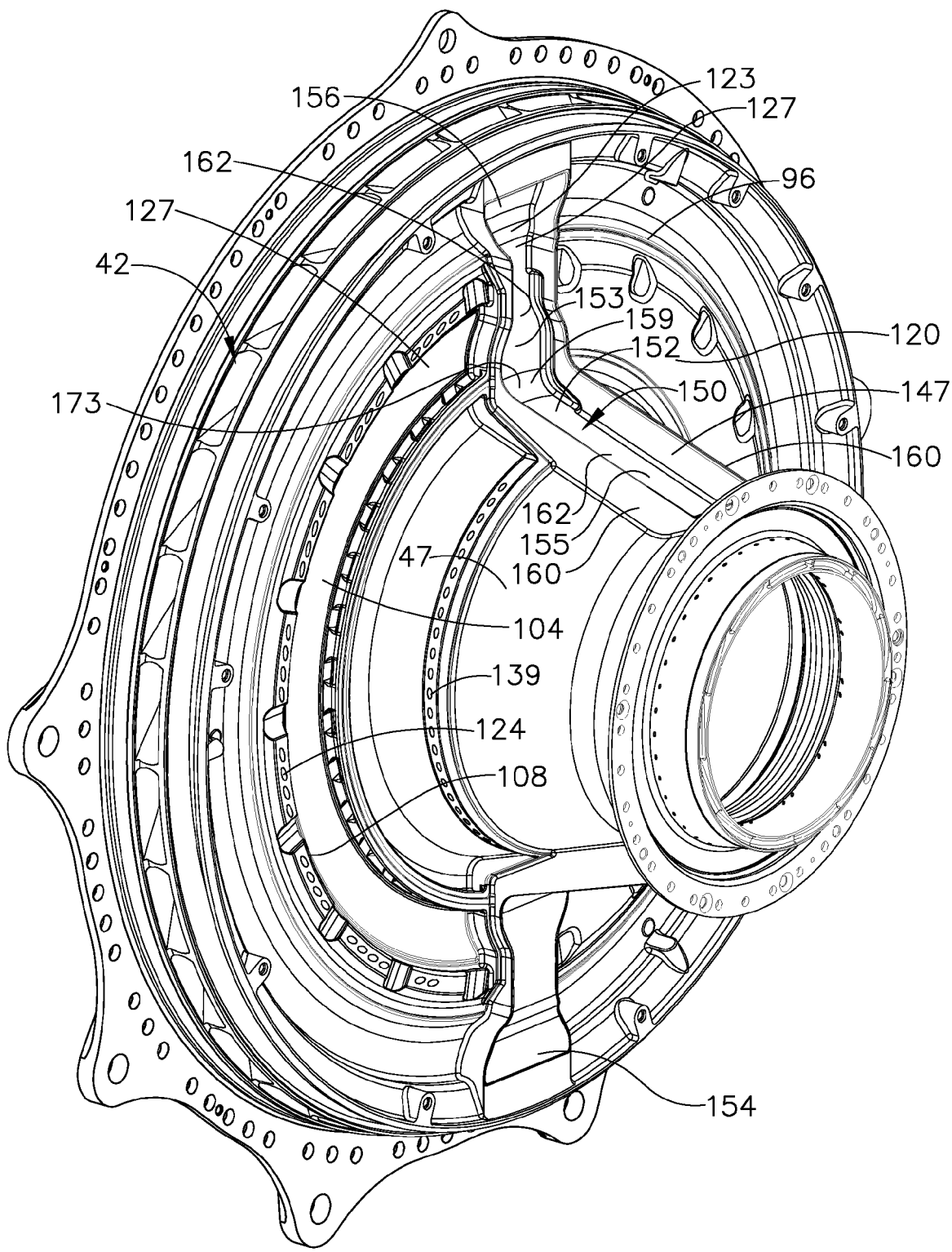
FIG. 5 is a perspective view illustration of a diffuser and inner combustor casing in the gas generator illustrated in FIG. 4.
Figure 6:
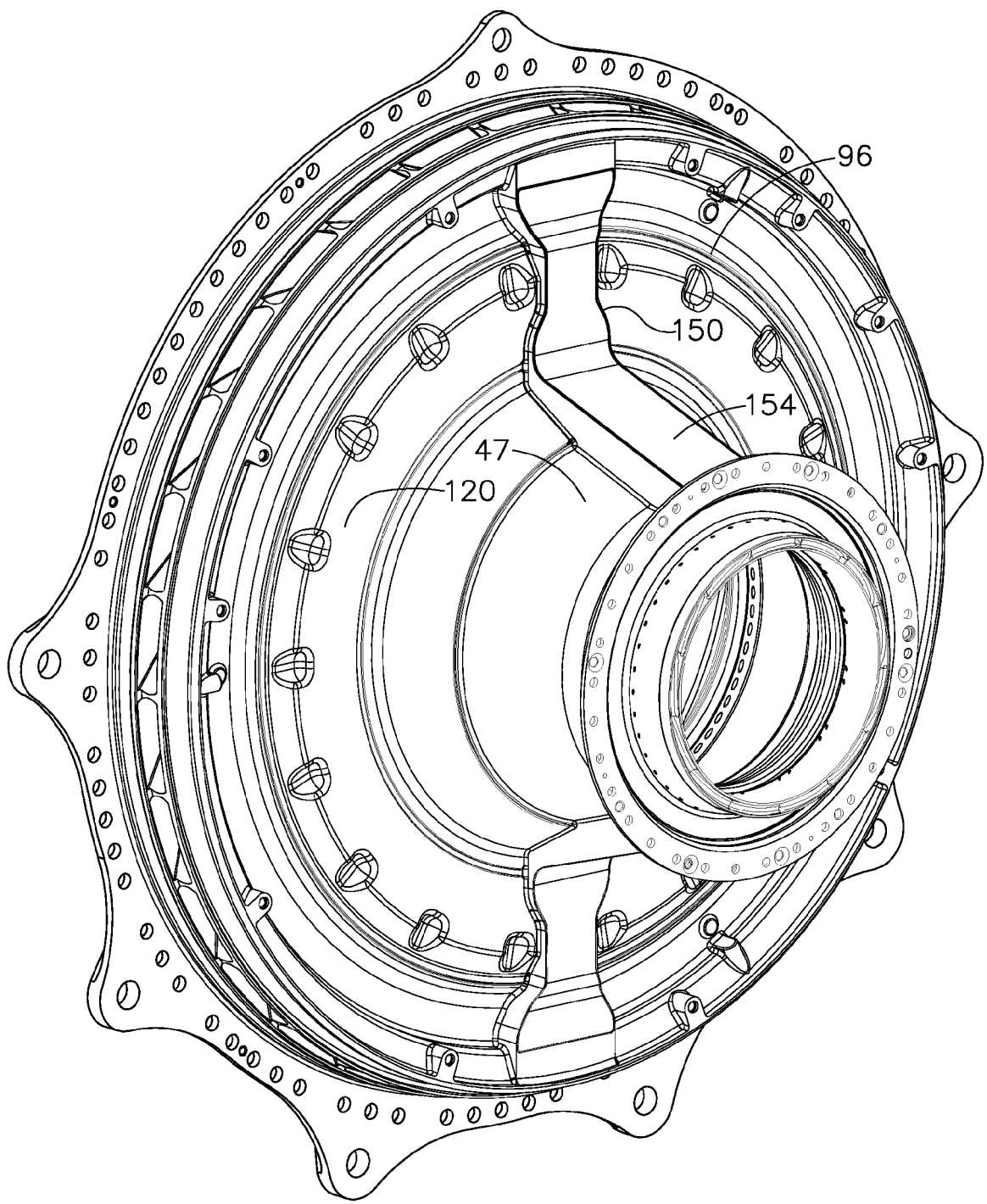
FIG. 6 is a perspective view illustration of a cover over the diffuser and inner combustor casing forming a plenum therebetween in the gas generator illustrated in FIG. 4.

Referring to FIGS. 4 and 5, the design of the size of the angled metering holes 139 is used to precisely control the amount of forward rotor thrust. The metering holes 139 are circumferentially angled. Bleeding air through the conical diffusion holes 124 in the inner portion 108 of the forward end wall 96 increases the amount of impeller tip aft bleed flow 102 and enables the impeller tip aft bleed flow 102 to achieve an empirically-derived optimal amount of the impeller tip aft bleed flow rate which, in turn, increases centrifugal compressor efficiency.

A turbine cooling system 137 with very low turning losses is illustrated in FIG. 3. The turbine cooling system 137 is used to cool high-pressure turbine (HPT) first stage blades 92 of the first stage disk 60 with clean cooling air 97 in order to minimize sand and/or dirt ingested into HPT blade cooling passages and, thus, prevent blocking of the small blade cooling passages and consequent blade failure. The clean cooling air 97 is bled at a bleed location 95 downstream of an outlet 140 of the diffuser 42 as the CDP air 76 enters the deswirl cascade 44 along an internal radius portion 133 thereof. The clean cooling air 97 bled in this manner is substantially free of particulate matter which could clog fine cooling passages in the first stage blades 92 of the first stage disk 60.

Referring to FIGS. 3-5, the clean cooling air 97 is bled into and collected in an annular manifold 148 and flowed radially inwardly through at least one or more cooling air channels 150. The exemplary embodiment of the turbine cooling system 137 illustrated herein includes two cooling air channels 150. Each of the cooling air channels 150 has a channel inner wall 152 formed and running along a radially outer portion 156 of the forward end wall 96, the annular cover 120, and the inner combustor casing 47. The channel inner wall 152 includes a generally radially extending radial wall section 153 connected to a generally axially aftwardly extending axial wall section 155 by a curved wall section 159.

Circumferentially spaced apart channel side walls 160 extend outwardly from the channel inner wall 152. A channel outer wall 154 spaced outwardly from the channel inner wall 152 is attached to the channel side walls 160 thus sealing the cooling air channel 150. The channel inner and outer walls 152, 154 may be made from sheet metal. The cooling air channel 150 terminates at an aft conical section 161 of the inner combustor casing 47. The cooling air channel 150 thus includes a generally radially extending section 162 followed by a generally axially aftwardly extending section 163 which terminates at the aft conical section 161. A bend section 173 of the cooling air channel 150 connects the generally radially extending section 162 to the generally axially aftwardly extending section 163. The generally axially aftwardly extending section 163 is slightly angled radially inwardly going from the bend section 173 to the aft conical section 161 and the cooling air plenum 164. This provides a substantially straight flowpath for the clean cooling air 97 with a minimal amount of flow turning losses through the combustor 52. This provides cooling passages 147 for the clean cooling air 97 that run along along the radially outer portion 156 of the forward end wall 96, the annular cover 120, and the inner combustor casing 47. The cooling passages 147 provide a straight through uninterrupted flowpath through the combustor 52 with no turning losses.

Cooling air apertures 157 in the aft conical section 161 allow the clean cooling air 97 to flow directly into an annular cooling air plenum 164 within the plenum casing 158. The clean cooling air 97 is accelerated by a one or more accelerators 165 attached to the plenum casing 158 at an aft end of the cooling air plenum 164. The channels 150 terminate at and are in fluid communication with the annular cooling air plenum 164 which is in fluid supply communication with the one or more accelerators 165. The accelerators 165 inject the clean cooling air 97 into a stage one disk forward cavity 166 at a high tangential speed approaching wheel speed of the first stage disk 60 at a radial position of the accelerator 165. The clean cooling air 97 then flows through and cools the stage disk 60 and the first stage blades 92. The cooling air channels 150 terminating at the aft conical section 161 directly bounding the cooling air plenum 164 helps to provide a substantially straight flowpath for the clean cooling air 97 with a minimal amount of flow turning losses through the combustor 52.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine turbine cooling system comprising:
an annular centrifugal compressor impeller of a high pressure rotor and a diffuser directly downstream of the impeller,
a cooling air bleed means for bleeding clean cooling air from a bleed location downstream of an outlet of the diffuser,
one or more channels in fluid communication with the cooling air bleed means, each of the one or more channels having a generally radially extending section followed by a generally axially aftwardly extending section,
the one or more channels terminating at and in fluid communication with an annular cooling air plenum having one or more accelerators, and
a generally axially aftwardly extending section of each of the one or more channels terminating at an aft conical section including cooling air apertures of an inner combustor casing diverging outwardly with respect to an engine centerline and disposed between the one or more channels and the annular cooling air plenum.

2. A system as claimed in claim 1, further comprising the cooling air bleed means including an annular manifold in fluid communication with the bleed location downstream of an outlet of the diffuser.

3. A system as claimed in claim 2, further comprising the bleed location located downstream of an outlet of the diffuser.

4. A system as claimed in claim 1, further comprising the generally radially and axially aftwardly extending sections being connected by a bend section of the cooling air channel and the generally axially aftwardly extending section being angled radially inwardly going from the bend section to the cooling air plenum.

5. A system as claimed in claim 4, further comprising the cooling air bleed means including an annular manifold in fluid communication with the bleed location downstream of an outlet of the diffuser.

6. A system as claimed in claim 5, further comprising the bleed location located where compressor discharge pressure air enters a deswirl cascade along an internal radius portion of the deswirl cascade.

7. A gas turbine engine turbine cooling system comprising:
an annular centrifugal compressor impeller of a high pressure rotor and a diffuser directly downstream of the impeller,
a cooling air bleed means for bleeding clean cooling air from a bleed location downstream of an outlet of the diffuser,
one or more channels in fluid communication with the cooling air bleed means, each of the one or more channels having a generally radially extending section followed by a generally axially aftwardly extending section,
the one or more channels terminating at and in fluid communication with an annular cooling air plenum having one or more accelerators,
an annular combustor stator assembly including a radially extending forward end wall extending radially outwardly from and joined to an inner combustor casing,
a radially outer portion of the forward end wall being an aft wall of the diffuser,
a stator plenum disposed between and in fluid communication with the impeller and an annular cavity extending radially between the inner combustor casing and the high pressure rotor and extending axially between forward and aft thrust balance seals,
the stator plenum being bounded by a radially inner portion of the forward end wall and an annular cover spaced axially aftwardly of the radially inner portion of the forward end wall, and
each of the cooling channels having a channel inner wall running along a radially outer portion of the forward end wall, the annular cover, and the inner combustor casing.

8. A system as claimed in claim 7, further comprising:
the annular cover including a cover aft wall having a planar annular wall section followed by a conical wall section,
circumferentially spaced apart channel side walls extending outwardly from and attached to the channel inner wall, and
a channel outer wall spaced outwardly from the channel inner wall and attached to the channel side walls.

9. A system as claimed in claim 8, further comprising each of the cooling channels terminating at an aft conical section of the inner combustor casing between the annular cooling air plenum and the cooling channels and cooling air apertures disposed through the aft conical section between the annular cooling air plenum and the cooling channels.

10. A gas turbine engine turbine cooling system comprising:
an annular centrifugal compressor impeller of a high pressure rotor and a diffuser directly downstream of the impeller,
a cooling air bleed means for bleeding clean cooling air from a bleed location downstream of an outlet of the diffuser,
one or more channels in fluid communication with the cooling air bleed means, each of the one or more channels having a generally radially extending section followed by a generally axially aftwardly extending section,
the one or more channels terminating at and in fluid communication with an annular cooling air plenum having one or more accelerators,
the generally radially and axially aftwardly extending sections being connected by a bend section of the cooling air channel and the generally axially aftwardly extending section being angled radially inwardly going from the bend section to the cooling air plenum,
an annular combustor stator assembly including a radially extending forward end wall extending radially outwardly from and joined to an inner combustor casing,
a radially outer portion of the forward end wall being an aft wall of the diffuser,
a stator plenum disposed between and in fluid communication with the impeller and an annular cavity extending radially between the inner combustor casing and the high pressure rotor and extending axially between forward and aft thrust balance seals,
the stator plenum being bounded by a radially inner portion of the forward end wall and an annular cover spaced axially aftwardly of the radially inner portion of the forward end wall, and
each of the cooling channels having a channel inner wall formed by and running along a radially outer portion of the forward end wall, the annular cover, and the inner combustor casing.

11. A system as claimed in claim 10, further comprising:
the annular cover including a cover aft wall having a planar annular wall section followed by a conical wall section,
circumferentially spaced apart channel side walls extending outwardly from the channel inner wall, and
a channel outer wall spaced outwardly from the channel inner wall and attached to the channel side walls.

12. A system as claimed in claim 11, further comprising each of the cooling channels terminating at an aft conical section of the inner combustor casing between the annular cooling air plenum and the cooling channels and cooling air apertures disposed through the aft conical section between the annular cooling air plenum and the cooling channels.

13. A gas turbine engine assembly comprising:
a combustor between a high pressure compressor and a high pressure turbine,
a high pressure rotor including a centrifugal compressor having an annular centrifugal compressor impeller directly adjacent to and downstream of a diffuser,
a cooling air bleed means for bleeding clean cooling air from a bleed location downstream of an outlet of the diffuser,
one or more channels in fluid communication with the cooling air bleed means,
each of the one or more channels having a generally radially extending section followed by a generally axially aftwardly extending section, the one or more channels terminating at and in fluid communication with an annular cooling air plenum having one or more accelerators, and a generally axially aftwardly extending section of each of the one or more channels terminating at an aft conical section including cooling air apertures of an inner combustor casing diverging outwardly with respect to an engine centerline and disposed between the one or more channels and the annular cooling air plenum.

14. A gas turbine engine assembly comprising:

a combustor between a high pressure compressor and a high pressure turbine, a high pressure rotor including a centrifugal compressor having an annular centrifugal compressor impeller directly adjacent to and downstream of a diffuser, a cooling air bleed means for bleeding clean cooling air from a bleed location downstream of an outlet of the diffuser, one or more channels in fluid communication with the cooling air bleed means, each of the one or more channels having a generally radially extending section followed by a generally axially aftwardly extending section, the one or more channels terminating at and in fluid communication with an annular cooling air plenum having one or more accelerators, an annular combustor stator assembly including a forward end wall extending radially outwardly from and joined to an inner combustor casing, a radially outer portion of the forward end wall being an aft wall of the diffuser, a stator plenum disposed between and in fluid communication with the impeller and an annular cavity extending radially between the inner combustor casing and the high pressure rotor and extending axially between forward and aft thrust balance seals, and the stator plenum being in part bounded by a radially inner portion of the forward end wall.

15. An engine assembly as claimed in claim 14, further comprising the cooling air bleed means including an annular manifold in fluid communication with the bleed location downstream of an outlet of the diffuser.

16. An engine assembly as claimed in claim 15, further comprising the bleed location located where compressor discharge pressure air enters a deswirl cascade along an internal radius portion of the deswirl cascade.

17. An engine assembly claimed in claim 14, further comprising:

an annular combustor stator assembly including a radially extending forward end wall extending radially outwardly from and joined to an inner combustor casing, a radially outer portion of the forward end wall being an aft wall of the diffuser, a stator plenum disposed between and in fluid communication with the impeller and the annular cavity, the stator plenum being bounded by a radially inner portion of the forward end wall and an annular cover spaced axially aftwardly of the radially inner portion of the forward end wall, and each of the cooling channels having a channel inner wall formed by and running along a radially outer portion of the forward end wall, the annular cover, and the inner combustor casing.

18. An engine as claimed in claim 17, further comprising:

the annular cover including a cover aft wall having a planar annular wall section followed by a conical wall section, circumferentially spaced apart channel side walls extending outwardly from the channel inner wall, and a channel outer wall spaced outwardly from the channel inner wall and attached to the channel side walls.

19. An engine as claimed in claim 18, further comprising each of the cooling channels terminating at an aft conical section of the inner combustor casing between the annular cooling air plenum and the cooling channels and cooling air apertures disposed through the aft conical section between the annular cooling air plenum and the cooling channels.

20. An engine as claimed in claim 18, further comprising the cooling air bleed means including an annular manifold in fluid communication with the bleed location downstream of an outlet of the diffuser.

21. An engine as claimed in claim 20, further comprising the bleed location located where compressor discharge pressure air enters a deswirl cascade along an internal radius portion of the deswirl cascade.

22. An engine as claimed in claim 14, further comprising the generally radially and axially aftwardly extending sections being connected by a bend section of the cooling air channel and the generally axially aftwardly extending section being angled radially inwardly going from the bend section to the cooling air plenum.

23. An engine as claimed in claim 22, further comprising:

an annular combustor stator assembly including a radially extending forward end wall extending radially outwardly from and joined to an inner combustor casing, a radially outer portion of the forward end wall being an aft wall of the diffuser, a stator plenum disposed between and in fluid communication with the impeller and the annular cavity, the stator plenum being bounded by a radially inner portion of the forward end wall and an annular cover spaced axially aftwardly of the radially inner portion of the forward end wall, and each of the cooling channels having a channel inner wall formed by and running along a radially outer portion of the forward end wall, the annular cover, and the inner combustor casing.

24. An engine as claimed in claim 23, further comprising:

the annular cover including a cover aft wall having a planar annular wall section followed by a conical wall section, circumferentially spaced apart channel side walls extending outwardly from the channel inner wall, and a channel outer wall spaced outwardly from the channel inner wall and attached to the channel side walls.

25. An engine as claimed in claim 24, further comprising each of the cooling channels terminating at an aft conical section of the inner combustor casing between the annular cooling air plenum and the cooling channels and cooling air apertures disposed through the aft conical section between the annular cooling air plenum and the cooling channels.

* * * * *